(12) United States Patent
DelGenio et al.

(10) Patent No.: US 12,413,009 B2
(45) Date of Patent: Sep. 9, 2025

(54) CABLE ASSEMBLY WITH INTEGRAL SEAL ELEMENT

(71) Applicant: Raytheon Company, Waltham, MA (US)

(72) Inventors: Joseph A. DelGenio, Marlborough, MA (US); Jonathan Hampton, Hudson, MA (US); Jason Glickman, Sudbury, MA (US); Tracy Lombardo, Seabrook, NH (US)

(73) Assignee: Raytheon Company, Tewksbury, MA (US)

( * ) Notice: Subject to any disclaimer, the term of this patent is extended or adjusted under 35 U.S.C. 154(b) by 0 days.

(21) Appl. No.: 17/176,090

(22) Filed: Feb. 15, 2021

(65) Prior Publication Data

US 2022/0263267 A1 Aug. 18, 2022

(51) Int. Cl.
*H01P 5/12* (2006.01)
*H01B 11/00* (2006.01)
*H01R 13/52* (2006.01)
*H01R 25/00* (2006.01)
*H02G 15/013* (2006.01)
*H02G 15/04* (2006.01)

(52) U.S. Cl.
CPC ....... *H01R 13/5205* (2013.01); *H02G 15/013* (2013.01); *H02G 15/04* (2013.01)

(58) Field of Classification Search
CPC ... H01R 13/5205; H02G 15/013; H02G 15/04
See application file for complete search history.

(56) References Cited

U.S. PATENT DOCUMENTS

| | | | |
|---|---|---|---|
| 4,537,458 A | 8/1985 | Worth | |
| 4,666,164 A | 5/1987 | Becker | |
| 5,098,753 A * | 3/1992 | Gregory | H01R 4/726 204/192.15 |
| 5,194,696 A | 3/1993 | Read | |
| 5,210,377 A * | 5/1993 | Kennedy | H01B 11/1839 174/107 |
| 5,247,424 A | 9/1993 | Harris | |
| 5,609,496 A | 3/1997 | Kilmer | |
| 8,112,129 B2 | 2/2012 | Shinoda | |

(Continued)

FOREIGN PATENT DOCUMENTS

| | | | |
|---|---|---|---|
| JP | 2005076864 A * | 3/2005 | |
| JP | 2006032845 A | 2/2006 | |

(Continued)

OTHER PUBLICATIONS

International Search Report for PCT/US21/62379 dated Apr. 26, 2022.

(Continued)

*Primary Examiner* — Timothy J Thompson
*Assistant Examiner* — Rhadames Alonzo Miller
(74) *Attorney, Agent, or Firm* — Getz Balich LLC

(57) ABSTRACT

An assembly is provided for an electric system. This electric system assembly includes an electric cable and a seal element. The seal element circumscribes and is configured integral with the electric cable. The seal element is configured from or otherwise includes a conductive polymer composite material.

18 Claims, 8 Drawing Sheets

(56) References Cited

U.S. PATENT DOCUMENTS

| | | | |
|---|---|---|---|
| 2012/0018196 A1* | 1/2012 | Lin | H05K 5/069 |
| | | | 174/254 |
| 2014/0235094 A1* | 8/2014 | Braun | H01R 13/5205 |
| | | | 439/391 |
| 2016/0307670 A1 | 10/2016 | Makino | |
| 2019/0009740 A1 | 1/2019 | Macks et al. | |
| 2019/0097408 A1* | 3/2019 | Czibur | H02G 3/081 |
| 2019/0131031 A1 | 5/2019 | Kobayashi | |

FOREIGN PATENT DOCUMENTS

| | | | |
|---|---|---|---|
| JP | 2010245232 A | | 10/2010 |
| JP | 2012028304 A | | 2/2012 |
| WO | WO-2018068990 A1 | * | 4/2018 |

OTHER PUBLICATIONS

EP Search Report for EP Patent Application No. 21926024.7 dated Sep. 23, 2024.
JP Office Action for JP Patent Application No. 2023-548821 dated Jul. 30, 2024.

* cited by examiner

CABLE ASSEMBLY WITH INTEGRAL SEAL ELEMENT

GOVERNMENT LICENSE RIGHTS

This invention was made with government support under contract no. FA8730-17-C-0010 awarded by the United States Department of Defense. The government has certain rights in the invention.

BACKGROUND OF THE DISCLOSURE

1. Technical Field

This disclosure relates generally to an electric system and, more particularly, to a cable assembly for the electric system.

2. Background Information

An electric system such as a controller may include an internal compartment for housing an electric circuit. To communicate with device(s) outside of the internal compartment, a cable connected to the electric circuit may be passed through a hole in a wall of the housing. However, environmental debris (e.g., dust) and/or unwanted signals (e.g., noise) may also pass through the hole. Such debris and noise may interfere with proper operation of the electric circuit. It is known in the art therefore to provide the housing with a discrete gasket that engages the cable when the housing is assembled to seal, inter alia, the hole. Placement of such a gasket, however, may be difficult where the wall is located internally within the housing. It is also known to provide a sealed terminal (e.g., a receptacle) in the wall, where the cable within the compartment is mated to one side of the terminal and a cable outside of the compartment is mated to another side of the terminal. Such a sealed terminal, however, is often bulky and may not be suitable for electric systems with compact sizes. There is a need in the art therefore for an improved cable assembly.

SUMMARY OF THE DISCLOSURE

According to an aspect of the present disclosure, an assembly is provided for an electric system. This electric system assembly includes an electric cable and a seal element. The seal element circumscribes and is configured integral with the electric cable. The seal element is configured from or otherwise includes a conductive polymer composite material.

According to another aspect of the present disclosure, another assembly is provided for an electric system. This electric system assembly includes a housing and a cable assembly. The housing includes a first compartment, a second compartment and a wall. The wall is between and forms the first compartment and the second compartment. The wall is configured with an aperture. The cable assembly includes an electric cable and a seal element. The cable assembly is configured to prevent at least radio frequency signal transmission through the aperture. The electric cable extends through the aperture into the first compartment and the second compartment. The seal element is seated in the aperture and bonded to the electric cable.

According to another aspect of the present disclosure, a manufacturing method is provided. During this manufacturing method, a seal element is formed integral with an electric cable to provide a cable assembly. The cable assembly is arranged with a housing. The housing includes a wall and an aperture extending through the wall. The electric cable projects through the aperture. The seal element is seated within the aperture such that the cable assembly plugs the aperture and is configured to prevent at least transmission of radio frequency signals through the aperture.

The seal element may include a first segment and a second segment. The forming of the seal element may include bonding the electric cable to the first segment and the second segment, where the electric cable is between the first segment and the second segment.

The seal element may be configured from or otherwise include a conductive polymer composite material.

The electric cable may be configured as a flexible ribbon cable.

The electric cable may include a sheath and an electric conductor within the sheath. The seal element may be bonded directly to the sheath.

The conductive polymer composite material may include a polymer foam and a plurality of metal particles embedded within the polymer foam.

The conductive polymer composite material may be configured to block transmission of radio frequency (RF) signals.

The seal element may include a first segment and a second segment. The electric cable may be between the first segment and the second segment.

The seal element may have a polygonal cross-sectional geometry.

The electric system assembly may include a conductive adhesive. This conductive adhesive may bond the seal element to the electric cable.

The electric system assembly may include a housing. This housing may include a wall. The electric cable may pass through an aperture in the wall. The seal element may be seated in the aperture. The seal element may be configured to plug an annular gap between the electric cable and the housing.

The wall may have a first face and a second face. The aperture may extend through the wall between the first face and the second face. A first portion of the seal element may project out from the first face. In addition or alternatively, a second portion of the seal element may project out from the second face.

The aperture may be configured as or otherwise include a dovetailed slot in the wall.

The housing may also include a lid. The seal element may be sandwiched between the wall and the lid.

The housing may be configured with a first compartment and a second compartment. The wall may be between the first compartment and the second compartment. A first end of the electric cable may be within the first compartment. In addition or alternatively, a second end of the electric cable may be within the second compartment.

The seal element may circumscribe the electric cable.

The seal element may be configured from or otherwise include a conductive polymer composite material.

The seal element may include a first segment and a second segment. The first segment and the second segment may be seated within the aperture. The electric cable may be between the first segment and the second segment.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
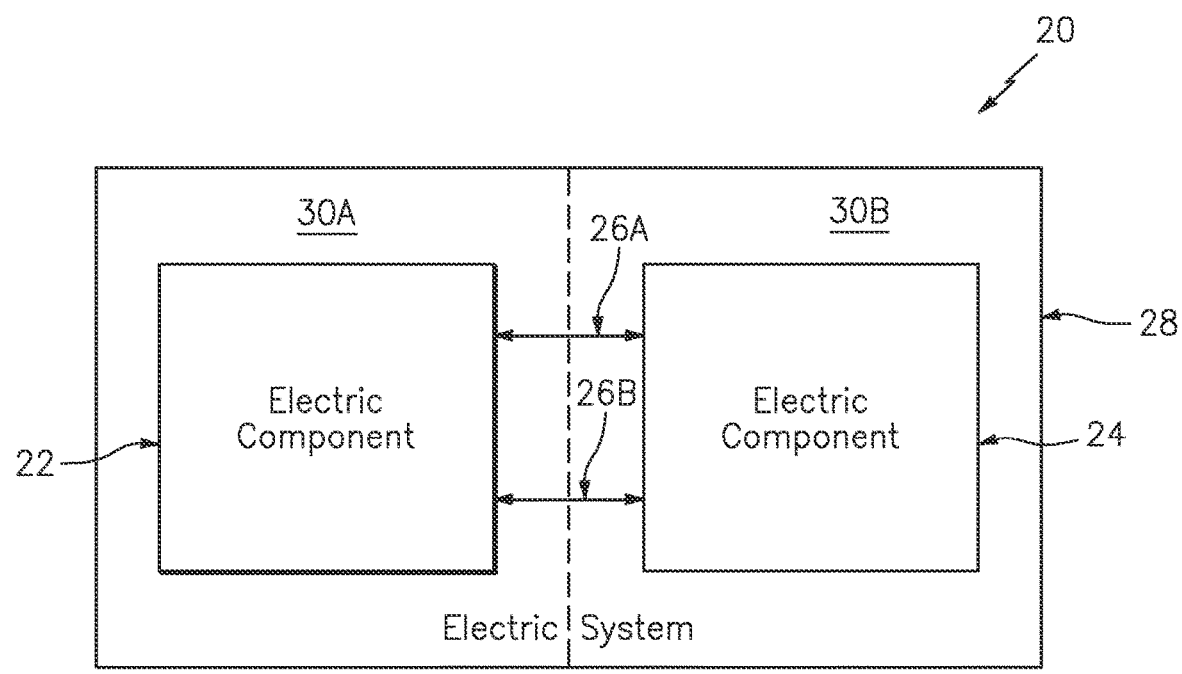
FIG. 1 is a schematic illustration of an electric system.

FIG. 1 illustrates an electric system 20. This electric system 20 may be configured as or otherwise include an electrical system and/or an electronic system. The electric system 20, for example, may be configured as a controller for an aerial, ground and/or aquatic vehicle or device. The present disclosure, however, is not limited to such an exemplary electric system configuration. The electric system 20, for example, may also or alternatively be configured as or otherwise include a communication system, a monitoring system, a junction box and/or any other electric system that may utilize one or more cable assemblies as disclosed herein.

The electric system 20 of FIG. 1 includes a first electric component 22, a second electric component 24 and one or more unitary, standalone cable assemblies 26A and 26B (generally referred to as "26"). The electric system 20 of FIG. 1 also includes an electric system housing 28 for housing one or more of the electric system parts 22, 24 and 26.

Figure 2:
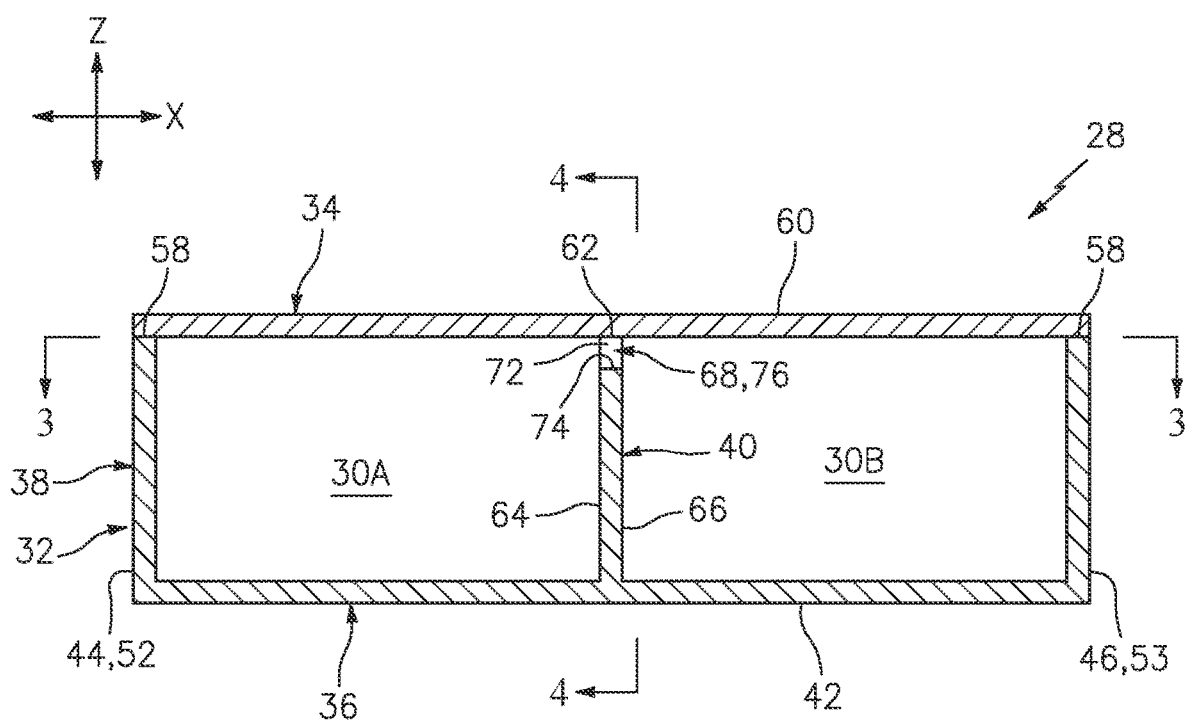
FIG. 2 is a sectional illustration of a housing for the electric system in an x-z plane.

Referring to FIG. 2, the electric system housing 28 is configured with one or more internal compartments 30A and 30B (generally referred to as "30"); e.g., chambers, cavities, etc. The internal compartments 30 of FIG. 2 are collectively formed by a base 32 and a lid 34 of the electrical system housing 28.

Figure 3:
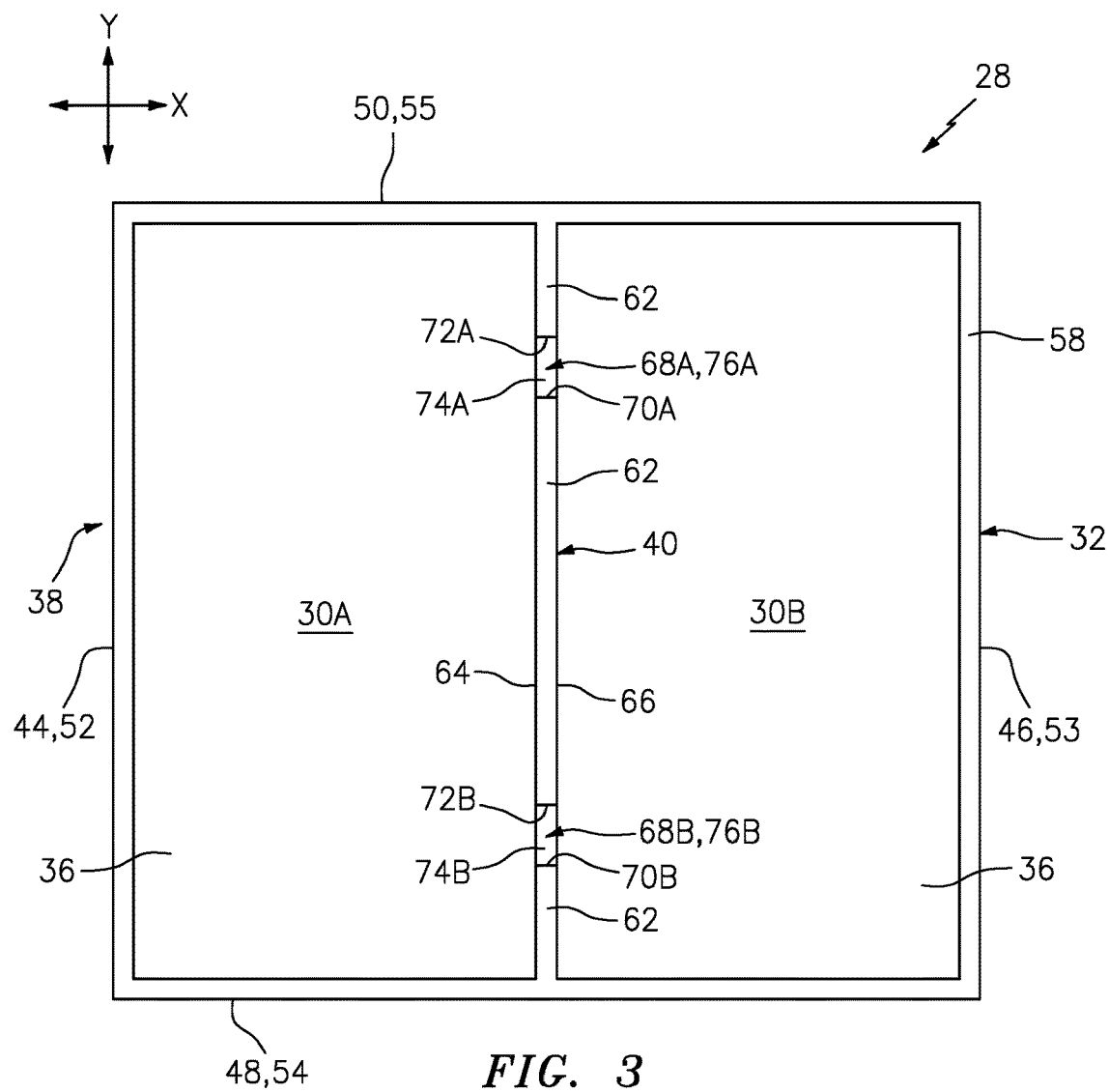
FIG. 3 is a sectional illustration of the electric system housing in an x-y plane taken along line 3-3 in FIG. 2.

The housing base 32 of FIG. 2 includes a base wall 36 (e.g., a bottom wall), an outer perimeter wall 38 (e.g., an exterior wall) and at least one inner wall 40 (e.g., an interior wall, a bulkhead, a divider, etc.). The base wall 36 may be a planar wall located at a first (e.g., bottom) end 42 of the electric system housing 28. Referring to FIG. 3, the base wall 36 extends lengthwise (e.g., along an x-axis) between opposing first and second sides 44 and 46 of the electric system housing 28. The base wall 36 extends widthwise (e.g., along a y-axis) between opposing third and fourth sides 48 and 50 of the electric system housing 28.

The perimeter wall 38 is connected to base wall 36. The perimeter wall 38 is located at (e.g., on, adjacent or proximate) one or more of the housing sides 44, 46, 48 and 50. The perimeter wall 38 has a (e.g., rectangular) tubular configuration to provide a peripheral boundary for the electric system housing 28 in a lengthwise-widthwise (e.g., x-y) plane. The perimeter wall 38 of FIG. 3, for example, includes a plurality of perimeter wall segments 52-55. The first wall segment 52 is located at the housing first side 44. The second wall segment 53 is located at the housing second side 46. The third wall segment 54 is located at the housing third side 48. The fourth wall segment 55 is located at the housing fourth side 50. Each of the first wall segment 52 and the second wall segment 53 of FIG. 3 extends widthwise (e.g., along the y-axis) between and is connected to the third wall segment 54 and the fourth wall segment 55. Each of the third wall segment 54 and the fourth wall segment 55 of FIG. 3 extends lengthwise (e.g., along the x-axis) between and is connected to the first wall segment 52 and the second wall segment 53. Referring to FIG. 2, each of the wall segments 52-55 projects vertically (e.g., along a z-axis) out from the base wall 36 to a distal end 58 of the perimeter wall 38, which perimeter wall distal end 58 may be proximate a second (e.g., top) end 60 of the electric system housing 28.

The inner wall 40 is connected to the base wall 36. The inner wall 40 projects vertically (e.g., along the z-axis) out from the base wall 36 to a distal end 62 of the inner wall 40. This inner wall distal end 62 may be co-planar with the perimeter wall distal end 58 (see also FIGS. 3 and 4). The inner wall 40 has and extends lengthwise (e.g., along the x-axis) between opposing faces 64 and 66; e.g., wall surfaces. Referring to FIG. 3, the inner wall 40 extends widthwise (e.g., along the y-axis) between and is connected to the third wall segment 54 and the fourth wall segment 55; see also FIG. 4.

Figure 4:
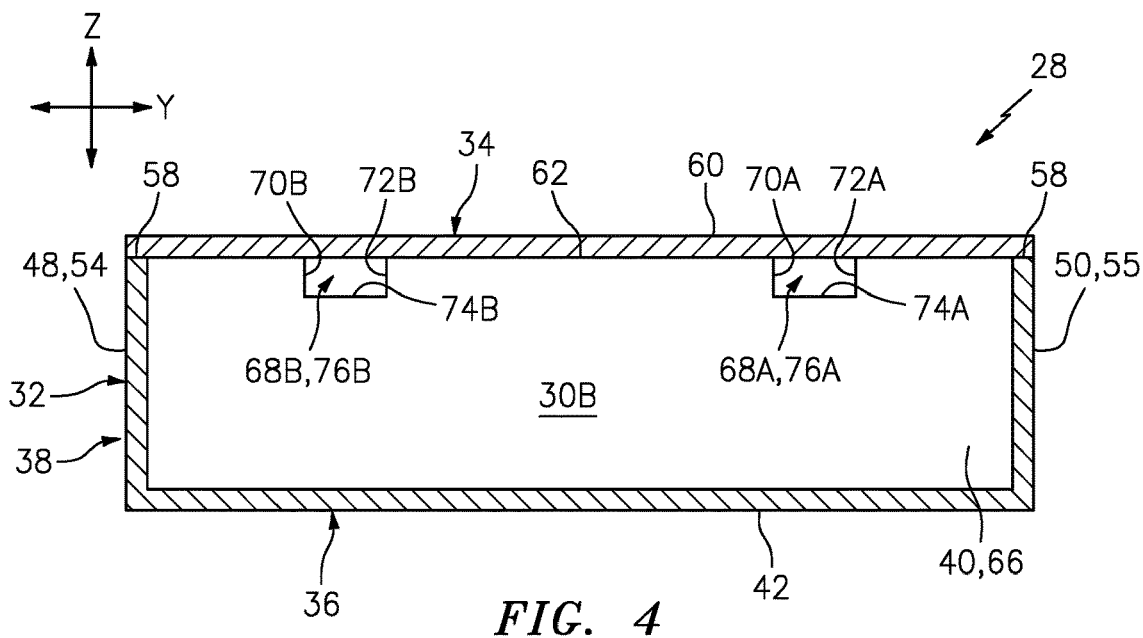
FIG. 4 is a sectional illustration of the electric system housing in a y-z plane taken along line 4-4 in FIG. 2.

The inner wall 40 of FIG. 3 includes one or more slots 68A and 68B (generally referred to as "68"); e.g., channels, notches, etc. These slots 68 are located at respective discrete widthwise (e.g., y-axis) locations along the inner wall 40 between the third wall segment 54 and the fourth wall segment 55. Each of these slots 68 extends lengthwise (e.g., along the x-axis) through the inner wall 40 between the inner wall first face 64 and the inner wall second face 66. Each of the slots 68 extends widthwise (e.g., along the y-axis) within the inner wall 40 between respective opposing slot side surfaces 70A, 70B (generally referred to as "70") and 72A, 72B (generally referred to as "72"); see also FIG. 4. Referring to FIG. 4, each of the slots 68 extends vertically (e.g., along the z-axis) into the inner wall 40 from the inner wall distal end 62 to a respective slot end surface 74A, 74B (generally referred to as "74").

Referring to FIGS. 2 and 4, the housing lid 34 is configured to enclose an open end of the housing base 32 at the housing second end 60. The housing lid 34 of FIGS. 2 and 4, for example, is configured as a planar member that engages (e.g., vertically seals against, contacts, etc.) the housing base 32 and, more particularly, one or more or all of the housing base parts 40 and 52-55. The housing lid 34 may be removably attached (e.g., mechanically fastened) to the housing base 32. The housing lid 34 of FIG. 2 extends lengthwise (e.g., along the x-axis) between and to the housing first side 44 and the housing second side 46. The housing lid 34 of FIG. 4 extends widthwise (e.g., along the y-axis) between and to the housing third side 48 and the housing fourth side 50.

Referring to FIG. 3, the first compartment 30A extends lengthwise (e.g., along the x-axis) between and is formed by first wall segment 52 and the inner wall 40 and its first face 64. The first compartment 30A extends widthwise (e.g., along the y-axis) between and is formed by the third wall segment 54 and the fourth wall segment 55. Referring to FIG. 2, the first compartment 30A extends vertically (e.g., along the z-axis) between and is formed by the base wall 36 and the housing lid 34.

Referring to FIG. 3, the second compartment 30B extends lengthwise (e.g., along the x-axis) between and is formed by second wall segment 53 and the inner wall 40 and its second face 66. The second compartment 30B extends widthwise (e.g., along the y-axis) between and is formed by the third wall segment 54 and the fourth wall segment 55. Referring to FIG. 2, the second compartment 30B extends vertically (e.g., along the z-axis) between and is formed by the base wall 36 and the housing lid 34.

Referring to FIG. 4, the first slot 68A is enclosed by the housing lid 34. The housing lid 34 and the inner wall 40 may thereby collectively form a first aperture 76A (e.g., a through-hole) within the electric system housing 28. Before the first slot 68A receives the first cable assembly 26A as described below (see FIG. 5), the first aperture 76A/the first slot 68A fluidly couple the first compartment 30A and the second compartment 30B together; see also FIG. 3.

The second slot 68B is enclosed by the housing lid 34. The housing lid 34 and the inner wall 40 may thereby collectively form a second aperture 76B (e.g., a through-hole) within the electric system housing 28. Before the second slot 68B receives the second cable assembly 26B as described below (see FIG. 5), the second aperture 76B/the second slot 68B fluidly couple the first compartment 30A and the second compartment 30B together; see also FIG. 3.

The electric system housing 28 and each of its parts 32 and 34 may be constructed from a conductive material such as, but not limited to, metal. Examples of the conductive material may include, but are not limited to, aluminum (Al), copper (Cu), nickel (Ni), titanium (Ti), carbon (C) and a (e.g., corrosion resistant) metal alloy such as an alloy including one or more of the foregoing metals. The conductive material may be coated with a protective coating, which coating may be selected to provide the respective component (e.g., 28, 32, 34) with corrosion protection.

Figure 5:
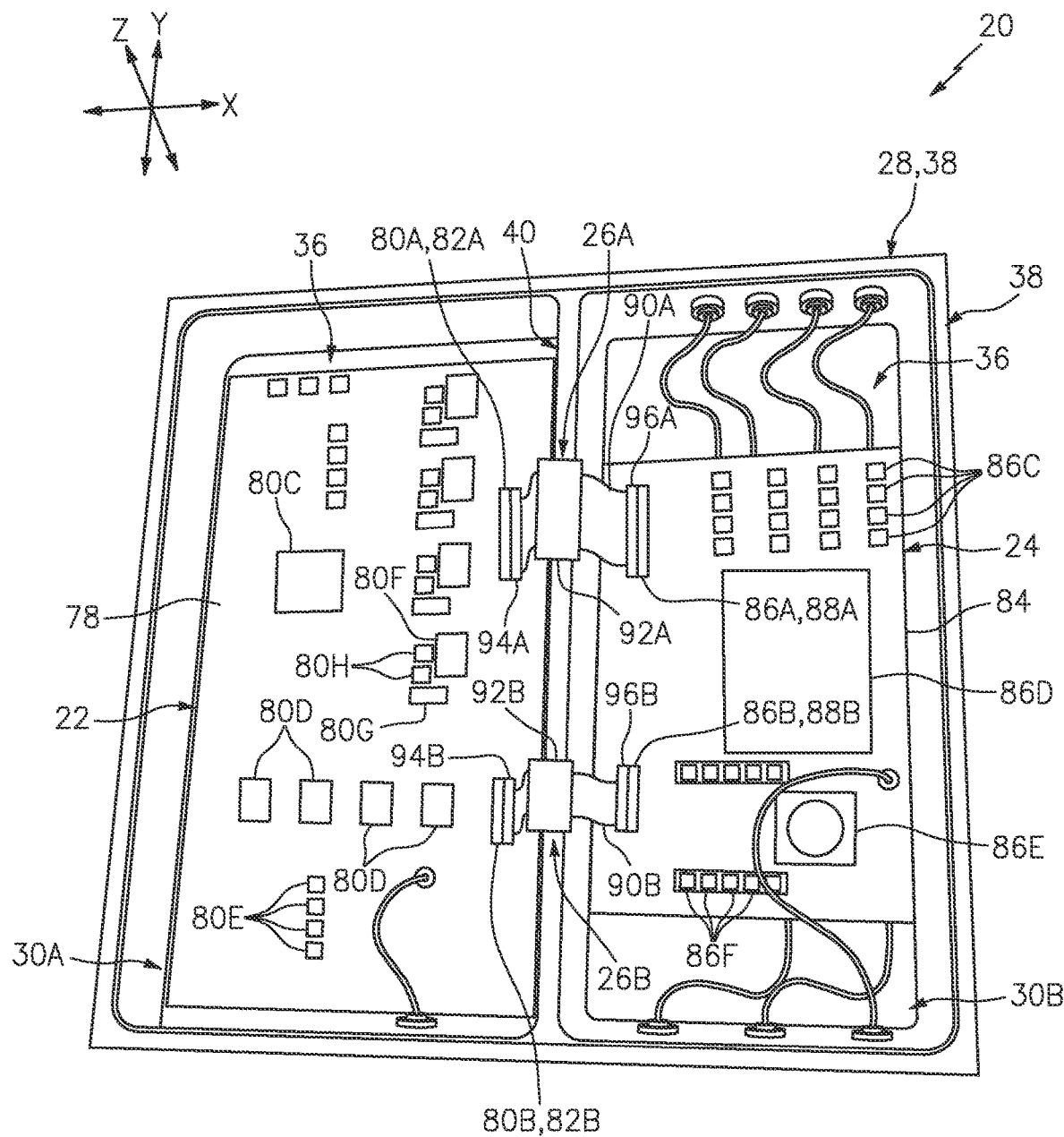
FIG. 5 is a perspective illustration of the electric system shown without a lid on a base of the electric system housing.

Referring to FIG. 5, the first electric component 22 may be configured as or otherwise include an electronic circuit. The first electric component 22 of FIG. 5, for example, includes a printed circuit board (PCB) 78 and one or more circuit elements (e.g., 80A-H; generally referred to as "80"); e.g., electronic components. These circuit elements 80 are mounted to the printed circuit board 78. Each of the circuit elements 80 is electrically coupled with one or more respective conductive paths (e.g., tracks) on the printed circuit board 78. Examples of the circuit elements 80 include, but are not limited to, processing device(s), memory device(s), resistor(s), capacitor(s), transistor(s), inductor(s), diode(s), switch(es), input device(s), output device(s), etc. Each circuit element 80A and 80B of FIG. 2, in particular, is configured as a terminal 82A, 82B (generally referred to as "82"); e.g., an input and/or output (I/O) device such as, but not limited to, a receptacle.

The first electric component 22 is arranged within the first compartment 30A. The first electric component 22 is mounted to the electric system housing 28 and, more particularly, the base wall 36 for example.

The second electric component 24 may be configured as or otherwise include an electronic circuit. The second electric component 24 of FIG. 5, for example, includes a printed circuit board (PCB) 84 and one or more circuit elements (e.g., 86A-F; generally referred to as "86"); e.g., electronic components. These circuit elements 86 are mounted to the printed circuit board 84. Each of the circuit elements 86 is electrically coupled with one or more respective conductive paths (e.g., tracks) on the printed circuit board 84. Examples of the circuit elements 86 include, but are not limited to, processing device(s), memory device(s), resistor(s), capacitor(s), transistor(s), inductor(s), diode(s), switch(es), input device(s), output device(s), etc. Each circuit element 86 of FIG. 2, in particular, is configured as a terminal 88A, 88B (generally referred to as "88"); e.g., an input and/or output (I/O) device such as, but not limited to, a receptacle.

The second electric component 24 is arranged within the second compartment 30B. The second electric component 24 is mounted to the electric system housing 28 and, more particularly, the base wall 36 for example.

Each of the cable assemblies 26A, 26B includes an (e.g., flexible) electric cable 90A, 90B (generally referred to as "90") and a seal element 92A, 92B (generally referred to as "92"). Each of the cable assemblies 26 of FIG. 5 also includes one or more terminals 94A, 94B (generally referred to as "94") and 96A, 96B (generally referred to as "96"); e.g., input and/or output (I/O) devices such as, but not limited to, plugs.

Figure 6:
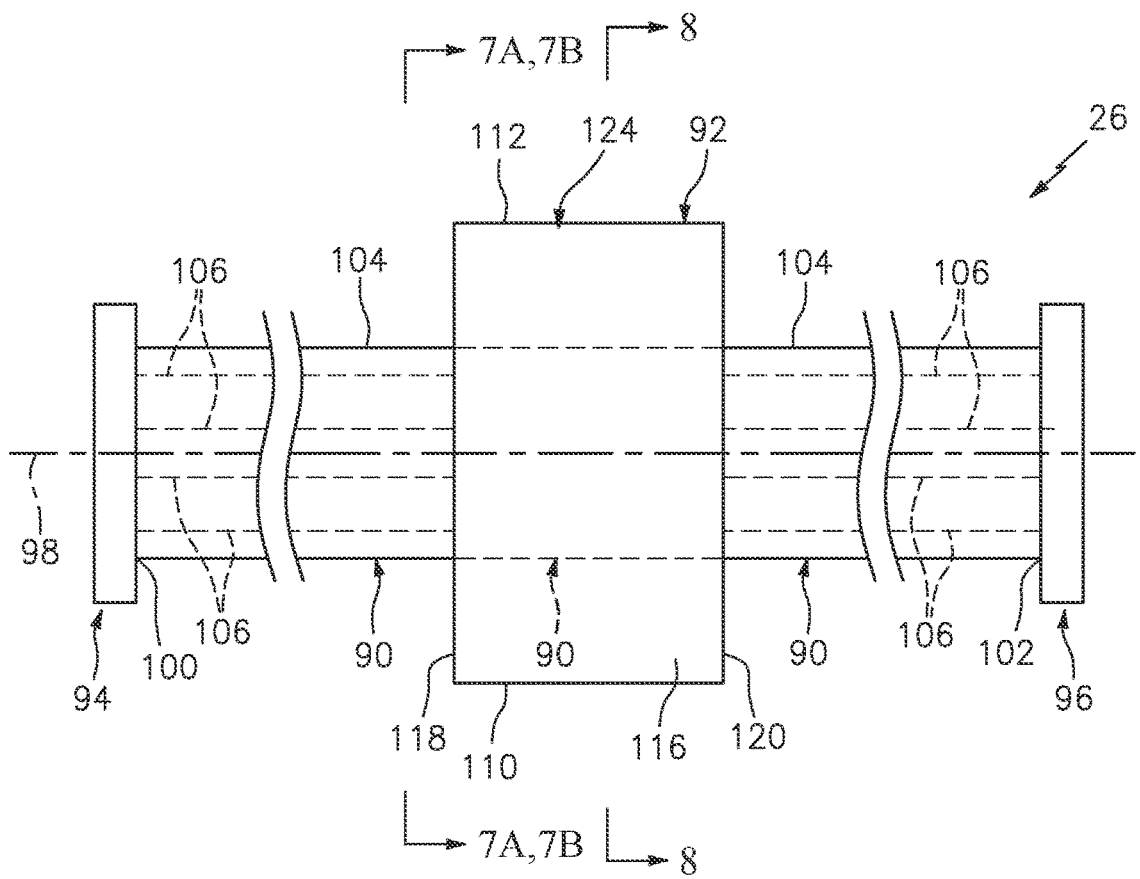
FIG. 6 is an illustration of a cable assembly with hidden internal electric conductors schematically shown by dashed lines.

Referring to FIG. 6, the electric cable 90 is adapted for transferring electricity and/or communicating signals. This electric cable 90 may be a (e.g., flexible) ribbon cable such as, but not limited to, a (e.g., shielded) coaxial ribbon or a (e.g., shielded) flex cable. The electric cable 90 of FIG. 6 has a length that extends longitudinally along a longitudinal centerline 98 of the respective cable assembly 26 between opposing longitudinal ends 100 and 102 of the electric cable 90.

The electric cable 90 of FIG. 6 includes a sheath 104 and one or more electric conductors 106 at least partially disposed within and/or covered by the sheath 104. The electric conductors 106 may be configured as conductive wires or conductive layers; e.g., laminae within a laminate. Each electric conductor 106 may be constructed from electrically conductive material such as metal; e.g., copper (Cu), etc. The sheath 104 may be constructed from dielectric/electrically non-conductive material such as polymer.

Figure 7A:
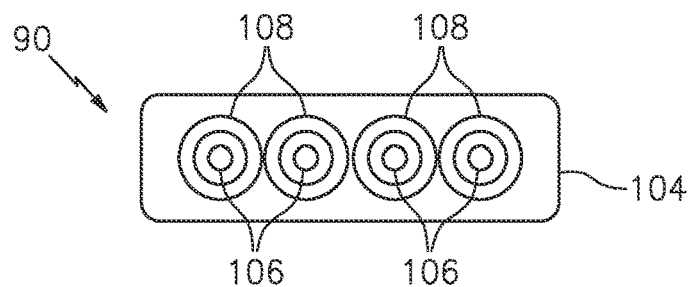
FIG. 7A is cross-sectional illustration of an electric cable for the cable assembly taken along line 7A-7A in FIG. 6.
Figure 7B:
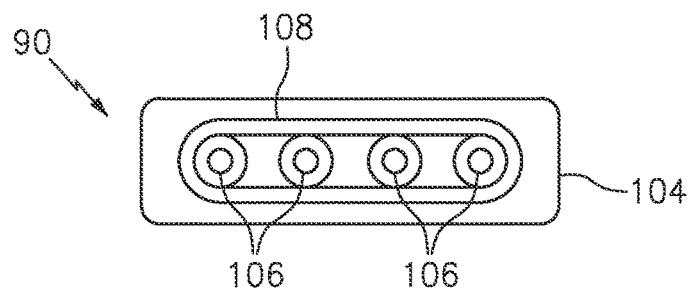
FIG. 7B is a cross-sectional illustration of another electric cable for the cable assembly taken along line 7B-7B in FIG. 6.

Referring to FIGS. 7A and 7B, the electric cable 90 may also include shielding material 108 such as, but not limited to, woven or non-woven metal. This shielding material 108 is adapted to shield one or more of the electric conductors 106 from outside interference. Referring to FIG. 7A, the shielding material 108 may be wrapped around each respective electric conductor 106. Referring to FIG. 7B, the shielding material 108 may alternatively (or also) be wrapped around a grouping of the electric conductors 106. The shielding material 108 of FIGS. 7A and 7B may be embedded within or otherwise covered by the sheath 104.

Referring to FIG. 6, the seal element 92 is located longitudinally along the centerline 98 intermediately between the cable first end 100 and the cable second end 102; e.g., approximately midway between the ends 100 and 102. The seal element 92 is configured integral with the electric cable 90. The seal element 92, for example, may be bonded (e.g., adhered) to the electric cable 90. Alternatively, the seal element 92 may be co-molded onto the electric cable 90.

Figure 8:
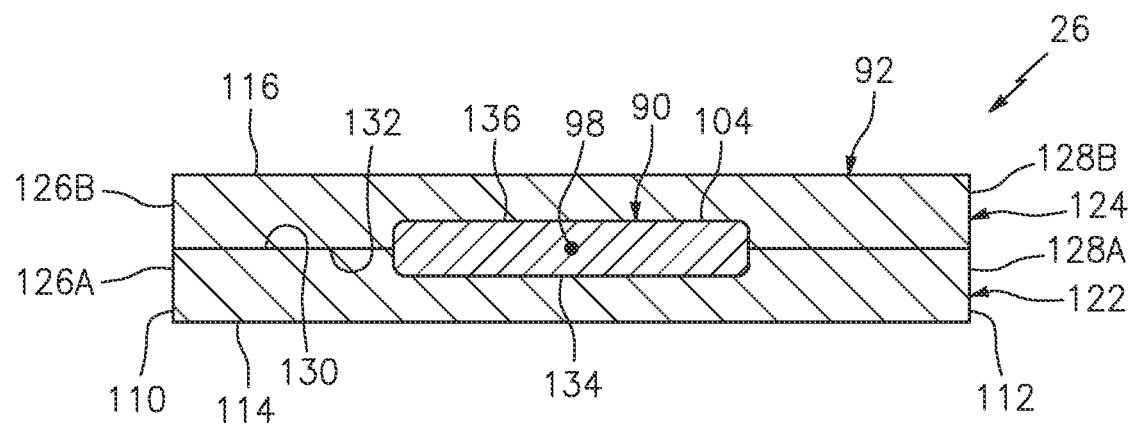
FIG. 8 is a cross-sectional illustration of the cable assembly taken along line 8-8 in FIG. 6, where the electric cable is shown without its internal parts for ease of illustration.

The seal element 92 of FIG. 8 wraps around/circumscribes an intermediate portion of the electric cable 90. The seal element 92 extends laterally between and to opposing first and second sides 110 and 112 of the seal element 92. The seal element 92 extends transversely between and to opposing third and fourth sides 114 and 116 of the seal element 92, where each of the seal element sides 114 and 116 extend laterally between and to the seal element sides 110 and 112. Referring to FIG. 6, the seal element 92 extends longitudinally along the centerline 98 between and to opposing first and second end 118 and 120 of the seal element 92, where each of the seal element sides 110, 112, 114 and 116 extends longitudinally between and to the seal element ends 118 and 120.

The seal element 92 of FIG. 8 include a plurality of segments 122 and 124; e.g., halves. The seal element first segment 122 is located at the seal element third side 114. The seal element second segment 124 is located at the seal element fourth side 116. Each seal element segment 122, 124 extends laterally between and to the seal element sides 110 and 112. Thus, side surfaces 126A and 126B, 128A and 128B of the seal element segments 122 and 124 are respectively flush at the seal element sides 110, 112. Each seal element segment 122, 124 extends transversely from a respective seal element side 114, 116 to a respective interface 130, 132. Referring to FIG. 6, each seal element segment 122, 124 (see 124 in FIG. 8) extends longitudinally between and to the seal element ends 118 and 120.

Referring to FIG. 8, the seal element first segment 122 is arranged next to a first side 134 of the electric cable 90. The first segment interface 130 is bonded (e.g., directly) to the electric cable 90/the sheath 104 by, for example, an electrically conductive adhesive; e.g., a conductive non-corrosive and/or pressure sensitive adhesive. Examples of the electrically conductive adhesive may include, but are not limited to, an electrically conductive silicon adhesive and an electrically conductive room-temperature-vulcanized (RTV) adhesive; e.g., electrically conductive RTV silicon adhesive. The seal element second segment 124 is arranged next to a second side 136 of the electric cable 90 as well as the seal element first segment 122 and its interface 130. The second segment interface 132 is bonded (e.g., directly) to the electric cable 90/the sheath 104 and the first segment interface 130 by, for example, the conductive adhesive. The intermediate portion of the electric cable 90 is disposed (e.g., sandwiched) between the seal segment segments 122 and 124. The intermediate portion of the electric cable 90 is thereby disposed laterally and transversely within, and longitudinally covered by, the seal element 92.

Figure 9:
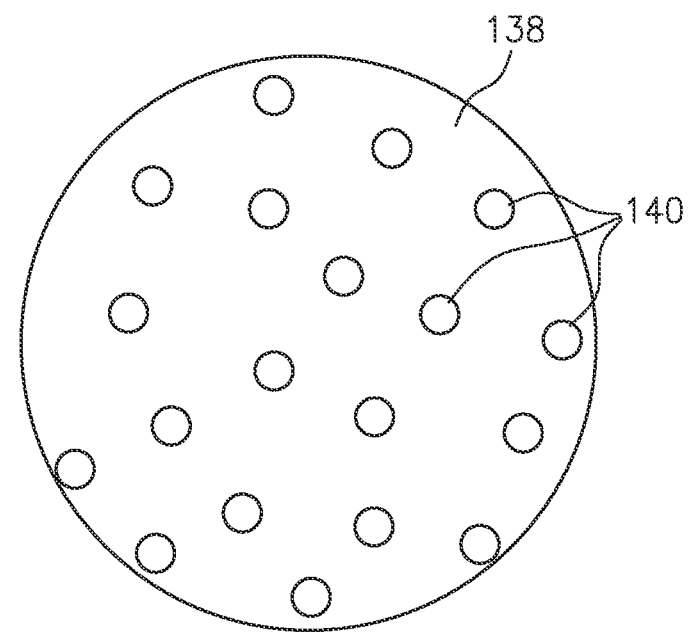
FIG. 9 is a sectional illustration of a portion of seal element material.

The seal element 92 and its segments 122 and 124 may be constructed from material adapted to block transmission therethrough of signal noise; e.g., electromagnetic interference (EMI) such as, but not limited to, at least radio frequency (RF) signals. The seal element 92 and its segment 122 and 124, for example, may be constructed from a conductive polymer composite material. Referring to FIG. 9, this composite material may include a (e.g., closed cell) polymer foam 138 and a plurality of conductive (e.g., metal) particles 140 embedded within the polymer foam 138. An example of the polymer foam 138 is a (e.g., conductive, low density) urethane foam. An example of the conductive particle 140 is a silver (Ag) plated, copper (Cu) particle. The present disclosure, however, is not limited to the foregoing exemplary foam/particle materials. Furthermore, the seal element material may also be adapted to block passage therethrough of certain environmental elements; e.g., dust, moisture, etc.

Figure 10:
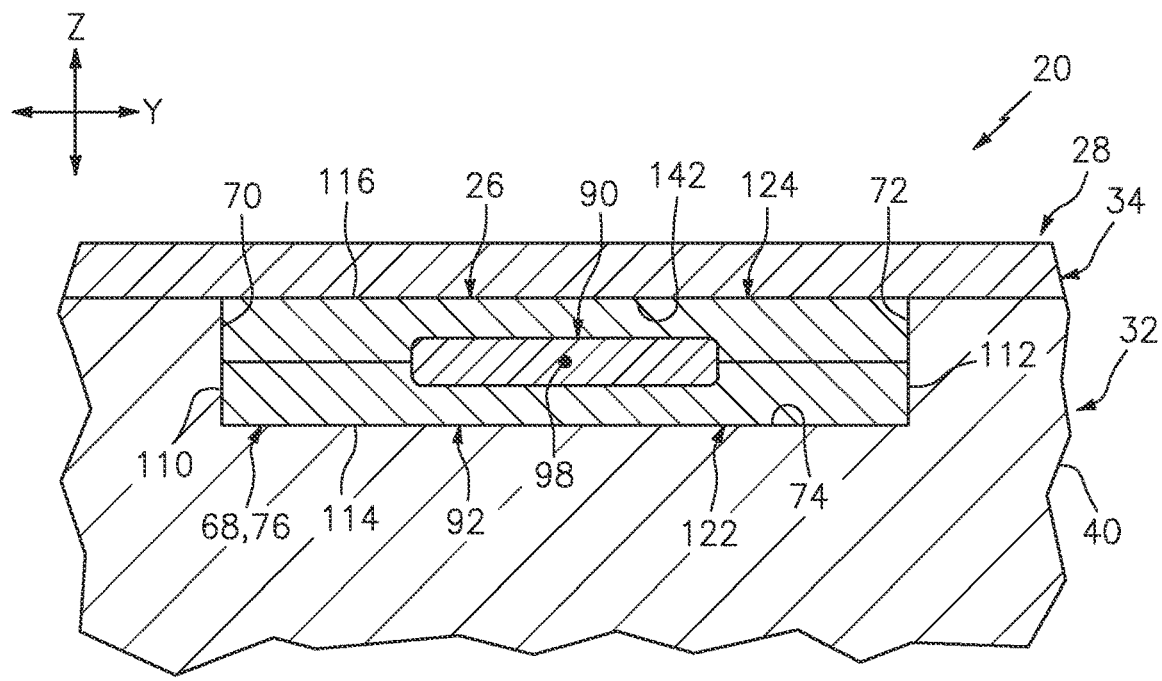
FIG. 10 is a partial sectional illustration of the electric system in the y-z plane.
Figure 11:
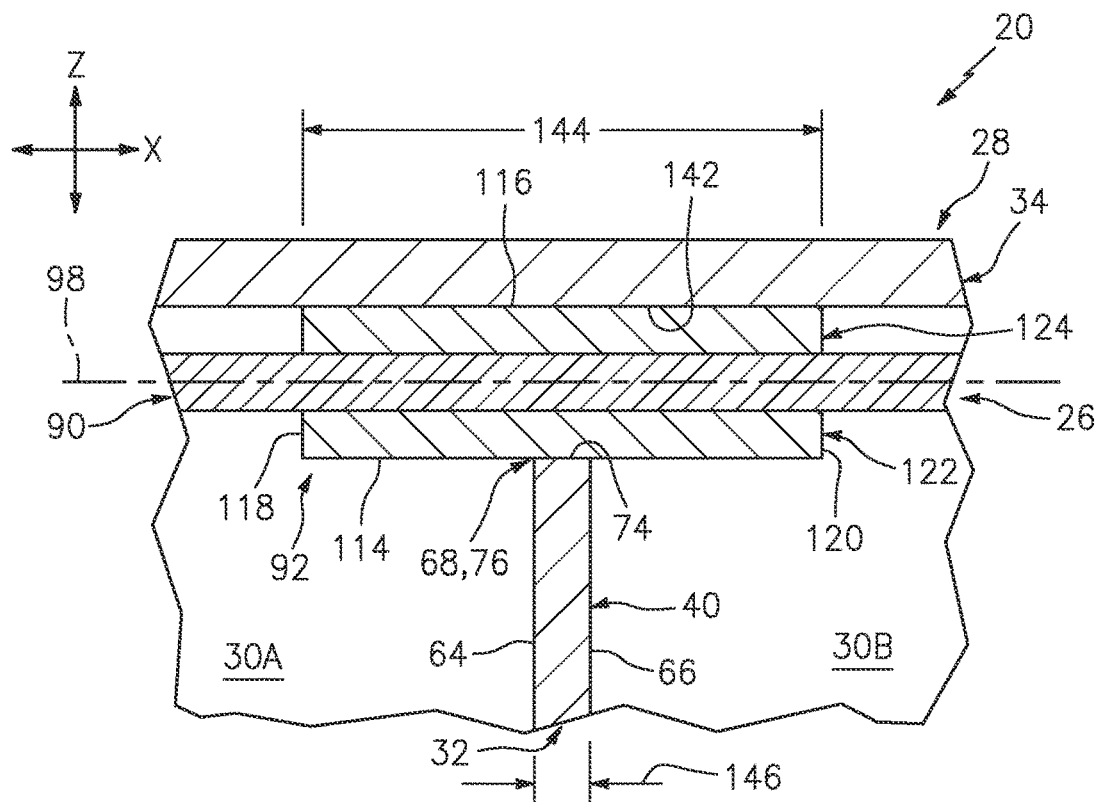
FIG. 11 is a partial sectional illustration of the electric system in the x-z plane.

Referring to FIG. 10, each of the cable assemblies 26 is mated with a respective one of the slots 68/apertures 76A and 76B (generally referred to as "76"). In particular, each seal element 92 and its segments 122 and 124 is seated within a respective one of the slots 68/apertures 76. Referring to FIGS. 10 and 11, each seal element third side 114 engages (e.g., is pressed vertically against) a respective one of the slot end surface 74. Each seal element fourth side 116 engages (e.g., is pressed vertically against) and interior surface 142 of the housing lid 34. Referring to FIG. 10, each seal element side 110, 112 engages (e.g., is pressed widthwise against) a respective one of the slot side surfaces 70, 72. Each seal element 92 thereby seals/plugs a (e.g., annular) gap between a respective one of the electric cables 90 and the electric system housing 28. In other words, each cable assembly 26 (e.g., a combination of the seal element 92 and the electric cable 90) seals/plugs a respective one of the apertures 76. With this arrangement, referring to FIG. 11, each electric cable 90 passes (e.g., extends, projects) through a respective one of the apertures 76 from the first compartment 30A to the second compartment 30B, while the respective cable assembly 26 and its seal element 92 prevent or reduce transmission of unwanted signals (e.g., RF signals) between the compartments 30 through the respective aperture 76.

A length 144 of each seal element 92 may be greater than a width 146 of the inner wall 40. A first portion of each seal element 92 of FIG. 11 projects out from the inner wall first face 64 into the first compartment 30A to the end 118. A second portion of each seal element 92 of FIG. 11 also (or alternatively) projects out from the inner wall second face 66 into the second compartment 30B to the end 120.

Figure 12:
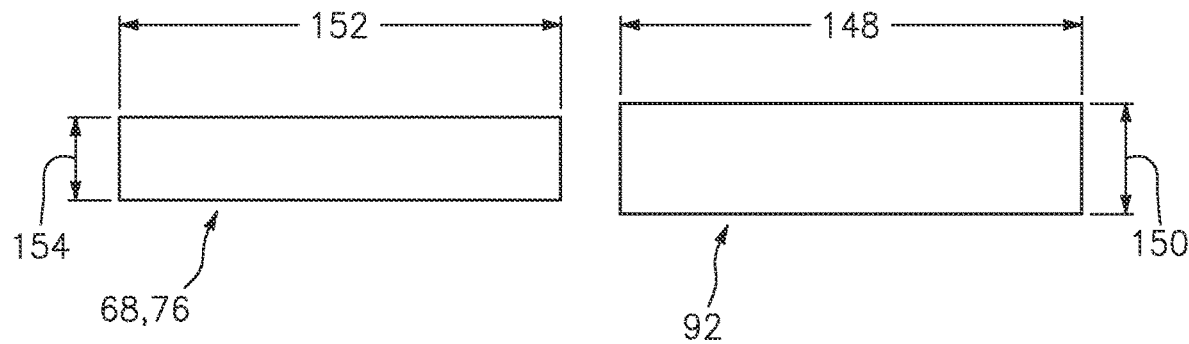
FIG. 12 schematically illustrates a perimeter of a slot/aperture and a perimeter of a seal element.

Referring to FIG. 12, dimensions (e.g., width 148 and/or height 150) of each seal element 92 may be sized greater than corresponding dimensions (e.g., width 152 and/or height 154) of each respective aperture 76 before assembly of the respective cable assembly 26 (see FIG. 6) with the electric system housing 28 (see FIGS. 2-4). Thus, when each seal element 92 is inserted into/seated within the respective slot 68 of FIGS. 10 and 11, the seal element material is (e.g., slightly) compressed and pressed against the housing parts 32 and 34.

Referring again to FIG. 5, a first portion and end of each electric cable 90 is disposed within the first compartment 30A. A second portion and end of each electric cable 90 is disposed within the second compartment 30B. Each of the terminals 94, 96 is mated with (e.g., plugged into) a respective one of the terminals 82, 88. Each cable assembly 26 thereby electrically couples the first electric component 22 in the first compartment 30A to the second electric component 24 in the second compartment 30B.

Figure 13:
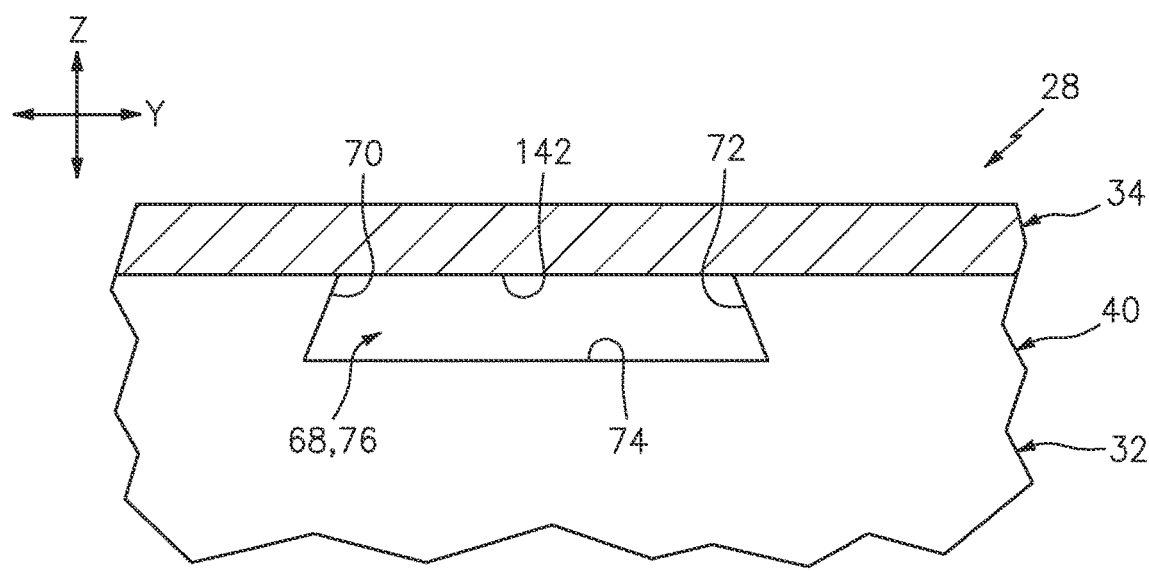
FIG. 13 is a partial sectional illustration of the electric system housing in the y-z plane.

In some embodiments, referring to FIG. 4, each slot 68 and associated aperture 76 may have a polygonal cross-sectional geometry when viewed, for example, in a plane perpendicular to the length of the associated electric cable 90 and/or the longitudinal centerline 98 of the associated cable assembly 26 (see FIG. 6); e.g., plane of FIG. 4. This polygonal cross-sectional geometry may be a rectangular cross-sectional geometry as shown in FIG. 4. Alternatively, referring to FIG. 13, the polygonal cross-sectional geometry may be a (e.g., isosceles) trapezoidal cross-sectional geometry. Each slot 68, for example, may be configured as a dovetail slot. The present disclosure, of course, is not limited to the foregoing exemplary cross-sectional geometries.

Figure 14:
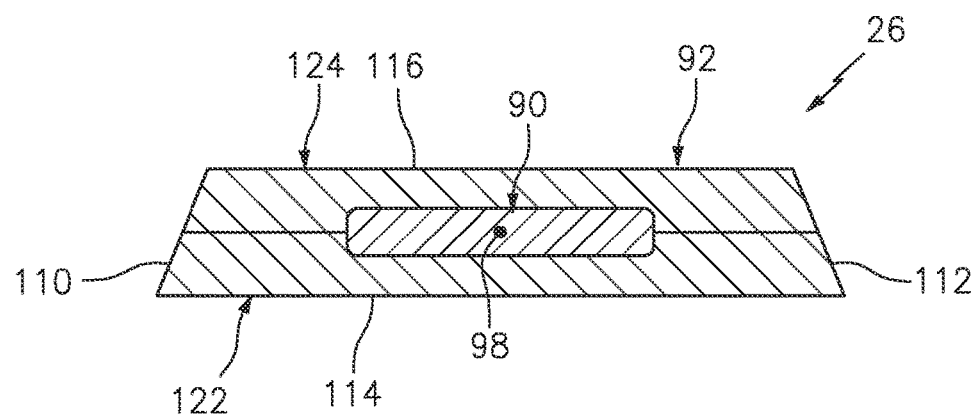
FIG. 14 is a cross-sectional illustration of the cable assembly.

In some embodiments, referring to FIG. 8, each seal element 92 may have a polygonal cross-sectional geometry when viewed, for example, in a plane perpendicular to the length of the associated electric cable 90 and/or the longitudinal centerline 98 of the associated cable assembly 26; e.g., plane of FIG. 8. This polygonal cross-sectional geometry may be a rectangular cross-sectional geometry as shown in FIG. 8. Alternatively, referring to FIG. 14, the polygonal cross-sectional geometry may be a (e.g., isosceles) trapezoidal cross-sectional geometry. The present disclosure, of course, is not limited to the foregoing exemplary cross-sectional geometries.

In some embodiments, each seal element 92 and each associated slot 68/aperture 76 may have similar/common cross-sectional geometry shapes. For example, each seal element 92 may have the cross-sectional geometry shape of FIG. 8 or FIG. 14 and each associated slot 68/aperture 76 may have the cross-sectional geometry shape of FIG. 4 or FIG. 13. However, in other embodiments, at least one of the seal elements 92 may have a different cross-sectional geometry shape than the associated slot 68/aperture 76. For example, each seal element 92 may have the cross-sectional geometry shape of FIG. 8 and each associated slot 68/aperture 76 may have the cross-sectional geometry shape of FIG. 13. With such an arrangement, the side surfaces 70 and 72 of each slot 68 may retain the associated cable assembly 26 during assembly (e.g., after mating with the slot 68 but before placement of the housing lid 34).

Figure 15:
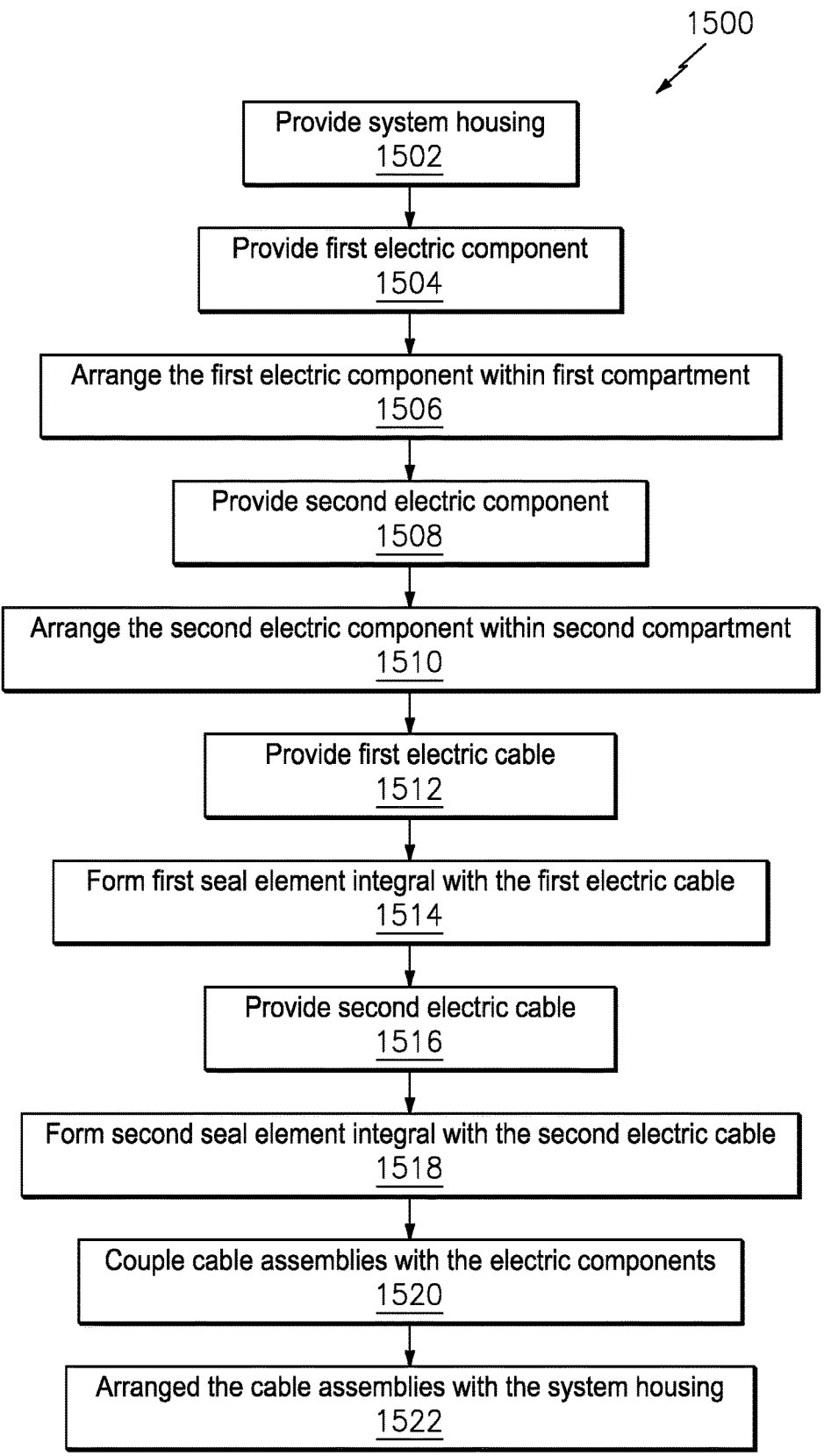
FIG. 15 is a flow diagram of a method for manufacturing the electric system.

FIG. 15 is a flow diagram of a method 1500 for manufacturing an electric system. For ease of description, the electric system is described below as the electric system 20 described above. However, the manufacturing method 1500 is not limited to manufacturing such an exemplary electric system.

In step 1502, the electric system housing 28 is provided.

In step 1504, the first electric component 22 is provided.

In step 1506, the first electric component 22 is arranged within the first compartment 30A.

In step 1508, the second electric component 24 is provided.

In step 1510, the second electric component 24 is arranged within the second compartment 30B.

In step 1512, the first electric cable 90A is provided.

In step 1514, the first seal element 92A is formed integral with the first electric cable 90A. The conductive adhesive, for example, may be applied to the first segment interface 130 of the seal element first segment 122. The first electric cable 90A may be arranged next to the seal element first segment 122 and bonded to the first segment interface 130 by the conductive adhesive. The conductive adhesive may also be applied to the interface 132 of the seal element second segment 124. This seal element second segment 124 may be arranged next to the first electric cable 90A and the seal element first segment 122. The conductive adhesive may bond the seal element second segment 124 to the first electric cable 90A as well as bond and electrically couple the seal element second segment 124 to the seal element first segment 122. Subsequently, the bonded seal element segments 122 and 124 may be cut (e.g., die cut) to provide the flush surfaces 126A and 126B, 128A and 128B at the first seal element sides 110, 112.

The bonding of the first seal element 92A to the first electric cable 90A may (e.g., permanently) affix the first seal element 92A to the first electric cable 90A. The bonding thereby forms the first seal element 92A and the first electric cable 90A into the unitary, standalone first cable assembly 26A. In other words, the first cable assembly 26A may be a complete unit, and may be moved as a standalone body. This is in contrast to, for example, a discrete seal element that is only arranged with a cable once the cable is arranged with a housing. This is also in contrast to, for example, a discrete seal element that is also used to seal a rim of a housing to a lid.

In step 1516, the second electric cable 90B is provided.

In step 1518, the second seal element 92B is formed integral with the second electric cable 90B. The conductive adhesive, for example, may be applied to the interface 130 of the seal element first segment 122. The second electric cable 90B may be arranged next to the seal element first segment 122 and bonded to the first segment interface 130 by the conductive adhesive. The conductive adhesive may also be applied to the interface 132 of the seal element second segment 124. This seal element second segment 124 may be arranged next to the second electric cable 90B and the seal element first segment 122. The conductive adhesive may bond the seal element second segment 124 to the second electric cable 90B as well as bond and electrically couple the seal element second segment 124 to the seal element first segment 122. Subsequently, the bonded seal element segments 122 and 124 may be cut (e.g., die cut) to provide the flush surfaces 126A and 126B, 128A and 128B at the second seal element sides 110, 112.

The bonding of the second seal element 92B to the second electric cable 90B may (e.g., permanently) affix the second seal element 92B to the second electric cable 90B. The bonding thereby forms the second seal element 92B and the second electric cable 90B into the unitary, standalone second cable assembly 26B. In other words, the second cable assembly 26B may be a complete unit, and may be moved as a standalone body. This is in contrast to, for example, a discrete seal element that is only arranged with a cable once the cable is arranged with a housing. This is also in contrast to, for example, a discrete seal element that is also used to seal a rim of a housing to a lid.

In step 1520, each cable assembly 26 is electrically coupled to the first electric component 22 and the second electric component 24, for example, as described above.

In step 1522, the first cable assembly 26A and the second cable assembly 26B are arranged with the electric system housing 28. The first seal element 92A, for example, may be seated within the first slot 68A as described above. Similarly, the second seal element 92B may be seated within the second slot 68B as described above. The housing lid 34 may subsequently be attached to the housing base 32, which thereby sandwiches each seal element 92 between the housing lid 34 and the housing base 32 and its inner wall 40.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an electric system, comprising:
a first electric component;
a second electric component;
a housing configured with a first compartment and a second compartment, the housing including a wall between the first compartment and the second compartment, the first electric component arranged within the first compartment, and the second electric component arranged within the second compartment;
a cable assembly comprising one or more terminals and an electric cable passing through an aperture in the wall, the electric cable extending lengthwise from a first end to a second end, wherein the second end opposes the first end, the first end of the electric cable within the first compartment, and the second end of the electric cable within the second compartment;
a seal element circumscribing and configured integral with the electric cable, the seal element comprising a conductive polymer composite material, the seal element seated in the aperture, and the seal element configured to plug an annular gap between the electric cable and the housing, and
a conductive adhesive bonding the seal element to the electric cable,
wherein at least one of the first electric component or the second electric component comprises a printed circuit board.

2. The assembly of claim 1, wherein the electric cable is configured as a flexible ribbon cable.

3. The assembly of claim 1, wherein the conductive polymer composite material is configured to block transmission of radio frequency (RF) signals.

4. The assembly of claim 1, wherein
the seal element includes a first segment and a second segment; and
the electric cable is between the first segment and the second segment.

5. The assembly of claim 1, wherein the seal element has a polygonal cross-sectional geometry.

6. The assembly of claim 1, wherein
the seal element has a seal element length;
the wall has a wall width; and
the seal element length is greater than the wall width.

7. The assembly of claim 1, wherein
the seal element has a seal element width in a non-assembled configuration;
the aperture has an aperture width in the non-assembled configuration; and
the seal element width is greater than the aperture width.

8. The assembly of claim 7, wherein the seal element is compressed when positioned within the aperture in an assembled configuration.

9. The assembly of claim 1, wherein
the seal element has a seal element cross sectional geometry with a first shape; and
the aperture has an aperture cross sectional geometry with a second shape that is different from the first shape.

10. The assembly of claim 1, wherein the first electric component includes a first printed circuit board, and wherein the second electric component includes a second printed circuit board.

11. An assembly for an electric system, comprising:
a first electric component;
a second electric component;
a housing configured with a first compartment and a second compartment, the first electric component arranged within the first compartment, and the second electric component arranged within the second compartment;
a cable assembly comprising one or more terminals and an electric cable, the electric cable comprising a sheath, one or more electric conductors at least partially disposed within and/or covered by the sheath, and shielding material adapted to shield the one or more electric conductors from outside interference; and
a seal element circumscribing and configured integral with the electric cable, the seal element comprising a conductive polymer composite material;
the seal element adhered or co-molded directly onto and covering a portion of the electric cable,
wherein:
the seal element comprises a first segment and a second segment, and
a first segment interface is directly bonded to the electric cable by an electrically conductive adhesive, and a second segment interface is directly bonded to the electric cable and to the first segment interface by the electrically conductive adhesive such that a portion of the electric cable is disposed laterally and transversely within, and is longitudinally covered by, the seal element; and
at least one of the first electric component or the second electric component comprises a printed circuit board.

12. The assembly of claim 11,
wherein the housing includes a wall between the first compartment and the second compartment;
the electric cable passing through an aperture in the wall; and
the seal element seated in the aperture, and the seal element configured to plug an annular gap between the electric cable and the housing.

13. The assembly of claim 12, wherein
the wall has a first face and a second face, and the aperture extends through the wall between the first face and the second face; and
at least one of
the first segment of the seal element projects out from the first face; or
the second segment of the seal element projects out from the second face.

14. The assembly of claim 12, wherein the aperture comprises a dovetailed slot in the wall.

15. The assembly of claim 12, wherein
the housing further includes a lid; and
the seal element is sandwiched between the wall and the lid.

16. The assembly of claim 12, wherein
the electric cable extends lengthwise from a first end to a second end, wherein the second end opposes the first end;
the first end of the electric cable is within the first compartment; and
the second end of the electric cable is within the second compartment.

17. The assembly of claim 11, wherein the seal element is adhered directly onto the sheath with a conductive adhesive.

18. An assembly for an electric system, comprising:
a first electric component;
a second electric component;
a housing configured with a first compartment and a second compartment, the first electric component arranged within the first compartment, and the second electric component arranged within the second compartment;
a cable assembly comprising one or more terminals and an electric cable, the electric cable comprising a sheath, one or more electric conductors at least partially disposed within and/or covered by the sheath, and shielding material adapted to shield the one or more electric conductors from outside interference; and a seal element circumscribing and configured integral with the electric cable, the seal element comprising a conductive polymer composite material;

the conductive polymer composite material comprising a polymer foam and a plurality of metal particles embedded within the polymer foam, wherein the seal element comprises a first segment and a second segment, a first segment interface directly bonded to the electric cable by an electrically conductive adhesive, and a second segment interface directly bonded to the electric cable and to the first segment interface by the electrically conductive adhesive, such that a portion of the electric cable is disposed laterally and transversely within, and is longitudinally covered by, the seal element; and wherein at least one of the first electric component or the second electric component comprises a printed circuit board.

* * * * *